(12) United States Patent  
Aeschbach

(10) Patent No.: US 7,688,530 B1  
(45) Date of Patent: Mar. 30, 2010

(54) MOUNTING SYSTEM FOR PRECISION MOUNTING OF INTERCHANGEABLE OPTICAL COMPONENTS

(75) Inventor: James Aeschbach, Cross Plains, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 117 days.

(21) Appl. No.: 12/114,426

(22) Filed: May 2, 2008

(51) Int. Cl.
*G02B 7/02* (2006.01)

(52) U.S. Cl. ........................ 359/811; 359/819

(58) Field of Classification Search ......... 359/694–700, 359/811–823; 396/529, 530
See application file for complete search history.

(56) References Cited

U.S. PATENT DOCUMENTS

| | | | |
|---|---|---|---|
| 5,473,963 A | 12/1995 | Aeschbach | 75/594.6 |
| 5,812,328 A * | 9/1998 | Suzuki et al. | 359/811 |
| 6,785,067 B1 * | 8/2004 | Andrews | 359/819 |
| 2003/0147153 A1 * | 8/2003 | Hookman | 359/819 |

OTHER PUBLICATIONS

Thorlabs, "Kinematic Base for APT6000 Series Stages," Thorlabs Catalog; www.thorlabs.com, (2006).

* cited by examiner

*Primary Examiner*—Mohammed Hasan
(74) *Attorney, Agent, or Firm*—Sunstein, Kann, Murphy & Timbers; Charles B. Katz; Michael C. Staggs

(57) ABSTRACT

A mounting system allowing rapid removal and replacement of optical components within an instrument includes a base unit connected to the instrument, and a carrier unit which includes an optical component. The carrier unit is magnetically attracted to the base unit, with mounting nubs extending from one of the base and carrier units being received in depressions defined in the other of the units. Preferably, the magnets on the base and carrier units are aligned, and V-groove depressions receive hemispherical surfaces presented by the mounting nubs. When the base and carrier units are generated using precision manufacturing methods, the optical component on the carrier unit can maintain a predefined alignment upon the base unit (and the instrument) with sub-micrometer precision between successive mountings and removals of the carrier unit, thereby avoiding the need to realign the optical component within the instrument every time the carrier unit is removed and replaced.

23 Claims, 2 Drawing Sheets

US 7,688,530 B1

MOUNTING SYSTEM FOR PRECISION MOUNTING OF INTERCHANGEABLE OPTICAL COMPONENTS

FIELD OF THE INVENTION

This document concerns an invention relating generally to instruments (such as spectrometers, fluorometers, spectrophotometers, etc.) which utilize interchangeable optical components, and more specifically to mounting arrangements for such interchangeable optical components.

BACKGROUND OF THE INVENTION

Numerous instruments analyze the properties of captured light, or otherwise rely on light to carry signals within the instruments. As an example, a molecular spectrometer (sometimes referred to as a spectroscope) is an instrument wherein a solid, liquid, or gaseous sample is illuminated, often with non-visible light such as light in the infrared region of the spectrum. The light from the sample is then captured and analyzed to reveal information about the characteristics of the sample. As an example, a sample may be illuminated with infrared light having known intensity across a range of wavelengths, and the light transmitted and/or reflected by the sample can then be captured for comparison to the illuminating light. Review of the captured spectra can then illustrate the wavelengths at which the illuminating light was absorbed by the sample.

In such instruments, since a misaligned beam of captured or transmitted light may at least give rise to non-optimal instrument performance, it is usually important that the path of the light beam be carefully controlled. For example, in a Raman spectrometer—a spectrometer using laser or other monochromatic light—optical components (lasers, lenses, mirrors, etc.) along the path of the light beam generally need to be mounted within a tolerance or "capture range" of about 2 micrometers ($7.913 \times 10-5$ inches), else beam misalignment will occur and operation may be impaired. Some components can be precisely aligned and then fixed in place in such a manner that they are resistant to subsequent misalignment, and adjustable mounting arrangements can be used for later "tuning" their alignment. In other cases, components are intended to be readily removable, possibly so that other components might be situated in their place—for example, a notch or band-pass filter might be removably mounted within an instrument so that it can be replaced with one or more other filters which block or accept other light wavelengths. Difficulties arise with such replaceable components because it is difficult to reproduce their desired alignment between subsequent removals and replacements, and thus it can take time to ensure the proper alignment of a component upon its installation. Mounting arrangements have been devised wherein components and/or the instrument bear placement pins or the like, such that when a component is mounted within the instrument, the pins attempt to precisely align the component. These arrangements are useful, but tend to lack the desired precision. Additionally, once a component is situated, it must often be fixed in place using fasteners (hold-down screws), latches, or similar arrangements, and these arrangements also tend to introduce variability into the component's alignment owing to the fixing forces exerted on the component and its mount. Difficulties in attaining the desired alignment are compounded by factors that tend to introduce variability in mounting precision, such as machining tolerances, surface quality/wear, environmental factors (e.g., temperature, pressure, and humidity), and of course user accuracy in effecting component placement. As a result, it can take considerable time (and can generate significant frustration) to mount an optical component within an instrument, particularly where components must be removed and replaced several times during the course of obtaining measurements.

SUMMARY OF THE INVENTION

The invention involves a mounting system for interchangeable optical components which is intended to at least partially solve the aforementioned problems. To give the reader a basic understanding of some of the advantageous features of the invention, following is a brief summary of preferred versions of the mounting system, with reference being made to the accompanying drawings (which are briefly reviewed in the following "Brief Description of the Drawings" section of this document) to assist the reader's understanding. Since the following discussion is merely a summary, it should be understood that more details regarding the preferred versions may be found in the Detailed Description set forth elsewhere in this document. The claims set forth at the end of this document then define the various versions of the invention in which exclusive rights are secured.

Referring to FIG. 1 for a perspective view of an exemplary mounting system 10, a carrier unit 100 is illustrated adjacent a base unit 200 in a ready-to-mount state (wherein the carrier unit 100, when mounted, is situated on the base unit 200, as will later be discussed with respect to FIG. 3). The base unit 200 is intended to be affixed within an instrument wherein optical components are interchangeably received (such as in the exemplary spectrometer 20 of FIG. 4), whereas the carrier unit 100 is intended to bear an optical component such as a laser, diffraction grating, filter, aperture, mirror, lens, prism, or the like (shown schematically in phantom at 30 in FIG. 1). Different carrier units 100 bearing different optical components 30 may therefore be swapped into the instrument 20 by removing one carrier unit from the base unit 200 and replacing it with another carrier unit.

One of the base unit 200 and the carrier unit 100 includes a face having mounting nubs protruding therefrom. In the exemplary mounting system 10 shown in the drawings (see FIG. 1), first, second, and third mounting nubs 202, 204, and 206 are provided on a receiving face 208 of the base unit 200. The other of the base unit 200 and the carrier unit 100 includes a face having depressions for receiving the mounting nubs 202, 204, and 206 when the carrier unit 100 is in the mounted state with respect to the base unit 200, and as depicted in FIG. 2, the exemplary mounting system 10 includes these depressions 102 and 104 (which are defined as elongated V-grooves) on an engaging face 106 of the carrier unit 100. When the carrier unit 100 is in the mounted state with respect to the base unit 200, the first depression 102 simultaneously receives the first and second mounting nubs 202 and 204 therein, and at the same time the second depression 104 receives the third mounting nub 206. Preferably, the receiving face 208 of the base unit 200 is spaced from the engaging face 106 of the carrier unit 100 when the carrier unit 100 is in the mounted state, such that the mounting nubs 202, 204, and 206 provide a three-point engagement between the carrier unit 100 and the base unit 200 (as discussed in greater detail below).

To assist in attracting the carrier unit 100 into proper alignment atop the base unit 200 during installation, and to better maintain the carrier unit 100 in the mounted state upon the base unit 200, the base unit 200 and the carrier unit 100 each bear one or more magnets (preferably a powerful magnet such as a NdFeB or other rare earth magnet). The magnets of the base unit 200 will hereinafter be referred to as receiving magnets (shown at 210*a*, 210*b*, 210*c*, and 210*d* in FIG. 1, and collectively referred to as receiving magnets 210) and the magnets of the carrier unit 100 will hereinafter be referred to as engaging magnets (shown at 108*a*, 108*b*, 108*c*, and 108*d* in FIG. 2, and collectively referred to as engaging magnets 108). The receiving magnets 210 of the base unit 200 are each situated at least partially within an area defined between the mounting nubs 202, 204, and 206. Each engaging magnet 108 of the carrier unit 100 is attracted to, and is preferably at least substantially aligned with and spaced from, a corresponding one of the receiving magnets 210 of the base unit 200 when the carrier unit 100 is situated in the mounted state adjacent the base unit 200. When a user moves a carrier unit 100 toward the mounted state adjacent a base unit 200 (as in FIG. 1), the attraction between the magnets 108 and 210 helps to properly align the carrier unit 100 with respect to the base unit 200, and fixes the carrier unit 100 to the base unit 200 in a standard and reproducible location. This location is defined by the engagement between the mounting nubs 202, 204, and 206 and the depressions 102 and 104 as well as by the magnetic attraction between the engaging magnets 108 and the receiving magnets 210. Additionally, so long as the engaging magnets 108 and the receiving magnets 210 provide sufficient attraction, the carrier unit 100 need not be situated atop a horizontally-oriented base unit 200, i.e., the base unit 200 will retain a carrier unit 100 in the mounted state even where the base unit 200 is oriented at vertical or other orientations (as in FIG. 4). It should be appreciated that the magnetic attraction provides greater reproducibility in mounting the carrier unit 100 on the base unit 200 than by use of the mounting nubs 202, 204, and 206 and depressions 102 and 104 alone, and conversely the mounting nubs 202, 204, and 206 and depressions 102 and 104 provide greater mounting reproducibility than by use of the magnets 108 and 210 alone.

To review the structure of the illustrated carrier unit 100 in greater detail, the carrier unit 100 bears the optical component 30 (FIG. 1) on a component face 110 situated opposite its engaging face 106 (FIG. 2). A variety of component mounting arrangements may be used, including simply affixing an optical component 30 to the carrier unit 100 via adhesive. The depressions 102 and 104 on the engaging face 106 (FIG. 2) which receive the mounting nubs 202, 204, and 206 are preferably defined as an elongated engaging face first depression 102 and an elongated engaging face second depression 104, with the engaging face second depression 104 preferably being oriented at a non-parallel angle with respect to the engaging face first depression 102 (and most preferably at an least substantially perpendicular angle with respect to the engaging face first depression 102). This arrangement helps to better fix the carrier unit 100 against displacement across the plane of the receiving face 208 of the base unit 200 when the carrier unit 100 is in the mounted state.

Turning then to the exemplary base unit 200, it bears a mounting face 212 (FIG. 2) opposite its receiving face 208 (FIG. 1), with the mounting face 212 being affixable to the instrument which interchangeably receives the different carrier units 100 and their different optical components 30. Such affixment preferably occurs via primary base mounting hole 214 and secondary base mounting holes 216*a*, 216*b*, 216*c*, and 216*d* (collectively referred to as secondary base mounting holes 216), discussed below. The receiving face 208 of the base unit 200 includes an elongated receiving face first depression 218 and an elongated receiving face second depression 220 similar to the engaging face depressions 102 and 104 of the carrier unit 100. The mounting nubs 202, 204, and 206 are each defined by spheres (e.g., ball bearings) which are affixed within the receiving face depressions 218 and 220, e.g., by an adhesive such as epoxy, with the receiving face first depression 218 bearing the first and second mounting nubs 202 and 204 and the receiving face second depression 220 bearing the third mounting nub 206. The receiving face depressions 218 and 220 are sized and configured (and the spheres of the mounting nubs 202, 204, and 206 are sized and configured) such that each mounting nub defines an at least substantially hemispherical surface protruding from the receiving face 208. As a result, when the mounting nubs 202, 204, and 206 are received within engaging face depressions 102 and 104 which are defined as V-grooves, the three-point engagement between the carrier unit 100 and the base unit 200 can actually be regarded as a six-point engagement, since the hemispherical surfaces presented by the three mounting nubs 202, 204, and 206 each contact (or at least are intended to contact) the two opposing sides of the engaging face depressions 102 and 104.

The mounting system 10 may be manufactured in the following manner. The base unit 200 and carrier unit 100 are preferably machined from appropriate materials—preferably aluminum or other metals—using high-precision techniques, e.g., via interferometer control. The carrier unit 100 is surface-hardened, as by hard anodizing, and is then preferably coated with TEFLON or a similar substance which provides a low coefficient of friction. The low-friction coating (and the hemispherical surfaces of the mounting nubs 202, 204, and 206) helps prevent scratching of the engaging face 106 by the mounting nubs 202, 204, and 206 as the user installs the carrier unit 100 atop the base unit 200, and the hardened surface helps to prevent the mounting nubs 202, 204, and 206 from "wearing into" the engaging face depressions 102 and 104 after repeated mountings.

The mounting nubs 202, 204, and 206, e.g., precision grade high-strength 25 steel ball bearings, can then be inserted at desired locations in the receiving face depressions 218 and 220 of the base unit 200 atop epoxy or a similar adhesive (preferably a low-viscosity adhesive). The carrier unit 100 may then be placed in the mounting state atop the mounting nubs 202, 204, and 206 and adjacent the carrier unit 100 before the adhesive sets. The adhesive will set and fix the mounting nubs 202, 204, and 206 in place as the carrier unit 100 is pulled toward the base unit 200 by the magnets 108 and 210. However, if the mounting nubs 202, 204, and 206 are formed of ferromagnetic material and the magnets 108 and 210 are sufficiently powerful, the magnets may pull the mounting nubs from the adhesive before it sets. Thus, it may be preferable to install the magnets 108 and 210 later, and instead use other arrangements to hold the carrier unit 100 and base unit 200 together about the mounting nubs 202, 204, and 206. As an example, the carrier unit 100 and base unit 200 might be urged together via magnets temporarily situated on the component face 110 and mounting face 212, with the magnets pulling the mounting nubs 202, 204, and 206 into the receiving face depressions 218 and 220, and also urging the carrier unit 100 and base unit 200 together about the mounting nubs. Unwanted magnetic interference with the installation of the mounting nubs 202, 204, and 206 can also be avoided if non-magnetic mounting nubs are used, e.g. mounting nubs made of ceramic, stone, non-magnetic metals, etc.

In any event, after the mounting nubs 202, 204, and 206 are adhered in place, when the carrier unit 100 is later removed from the mounting state and subsequently replaced back into the mounting state, the position/orientation of the carrier unit 100 will show little variance between the separate mountings. Carrier units 100 have been developed which exhibit less than a micrometer ($3.95699 \times 10-5$ inches) in variation between successive mountings, well within the range needed for successful spectrometer operation. Any optical component(s) 30 to be situated on a carrier unit 100 can then be situated atop the mounted carrier unit 100, adjusted into proper alignment, and fixed in place (e.g., via adhesive) such that the optical component(s) 30 will be properly aligned between successive mountings of the carrier unit 100 on the base unit 200.

However, at least the base unit 200 also preferably includes some means for fine-tuning the alignment of the base unit 200 and carrier unit 100 in case such alignment is nonetheless needed. As an example, referring to FIG. 2, the base unit 200 may include a slot 222a which extends from its mounting face 212 through a major portion of the base unit 200 to define base unit sections 224a and 224b on opposite sides of the slot 222a, with a minor portion 226 of the base unit 200 being left to join the base unit sections 224a and 224b. The base unit section 224a bears the receiving face first depression 218 and the first and second mounting nubs 202 and 204, and the base unit section 224b bears the receiving face second depression 220 and the third mounting nub 206. A tensioner 228a (here a threaded fastener, only the head of which is visible) can extend between the base unit sections 224a and 224b, and can be adjusted to draw the base unit sections 224a and 224b toward each other about the minor portion 226 of the base unit 200. In FIG. 2, the base unit 200 is "Z-cut" by a pair of slots 222a and 222b, and each has an associated tensioner 228a and 228b. By this arrangement, a user may affix the base unit 200 within an instrument (such as the spectrometer 30 of FIG. 4) via the primary base mounting hole 214, and may then adjust one or both of the tensioners 228a and 228b to adjust the angle of the receiving face first depression 218 and the first and second mounting nubs 202 and 204 with respect to the receiving face second depression 220 and the third mounting nub 206. (A third tensioner 228c is also provided if it is necessary to urge the base unit section 224a bearing the first and second mounting nubs 202 and 204 toward the other base unit section 224b and its third mounting nub 206.) The attachment of the base unit 200 to the instrument can then be completed via the secondary base mounting holes 216, with possible iterative adjustment of the tensioners 228 and the fasteners within the mounting holes 216 until the final desired alignment is achieved. Once the base unit 200 is properly aligned, the carrier unit 100 will effectively be properly aligned owing to the high reproducibility of the positioning of the carrier unit 100 on the base unit 200 (as discussed above). However, if desired, tuning arrangements known in the art may be provided on the carrier unit 100 as well as, or instead of, the base unit 200. (In this respect, an inexpensive arrangement is to use the same machined blanks/members for both the carrier and base units 100 and 200, such that the units have fundamentally the same underlying structure.)

Since different carrier units 100 with different optical components 30 may then be used at different times on the base unit 200 within the instrument, it is useful to provide some means whereby the instrument can automatically detect the presence and identity of a carrier unit 100 and the optical component(s) 30 thereon. This is preferably done by having the carrier unit 100 bear readable information regarding an optical component 30 situated on the component face 110, and providing a reader 230 on the base unit 200 which reads the readable information from the carrier unit 100 when the carrier unit 100 is in the mounted state. FIG. 1 presents an arrangement for providing this feature wherein an electronic memory 112 (such as an EEPROM) situated on the carrier unit 100 bears information regarding the optical component 30—such as its name/type, operating characteristics/instructions, etc.—and a reader 230 on the base unit 200 (and in communication with the instrument 20, as via port) reads the information. More specifically, the reader 230 bears spring-loaded conductive reading pins (FIG. 1) which read the encoded information when they make contact with inner and outer terminals 114a and 114b (FIG. 3) of the electronic memory 112.

Further advantages, features, and objects of the invention will be apparent from the remainder of this document in conjunction with the associated drawings.

DETAILED DESCRIPTION OF PREFERRED VERSIONS OF THE INVENTION

Figure 1:
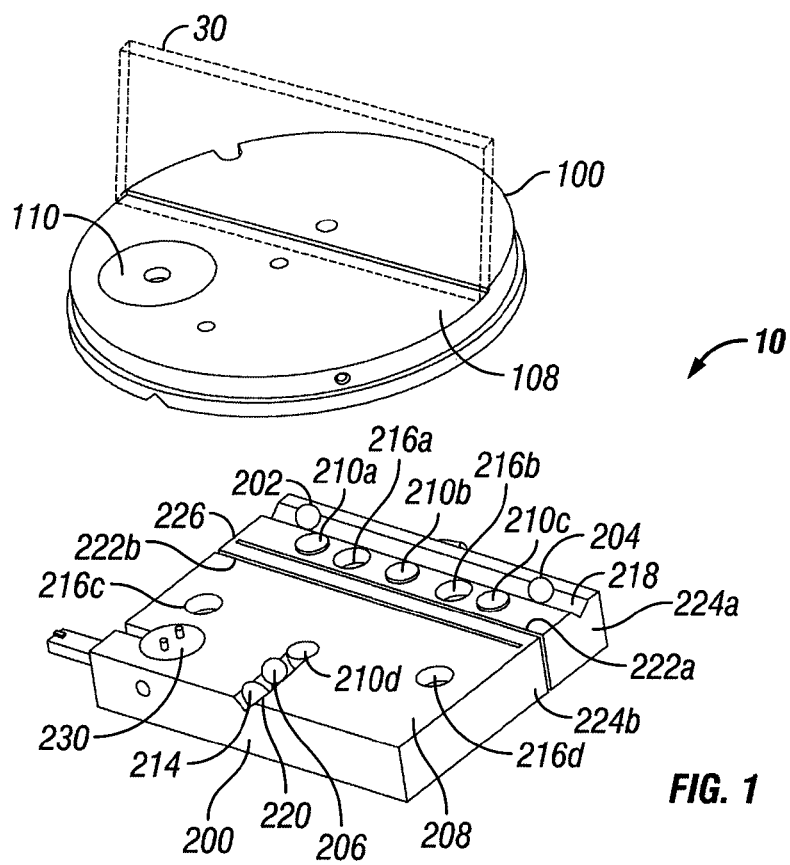
FIG. 1 is a first perspective view of an exemplary preferred mounting system 10, illustrating a carrier unit 100, which bears an optical component 30 (such as a filter) to be installed within an instrument, in a position wherein the carrier unit 100 is about to be mounted on a base unit 200 (which is installed within an instrument, not shown).

Expanding on the discussion above, it should be appreciated that the mounting system 10 allows optical components to be removed and replaced within instruments with exceptional speed and ease: carrier units 100 within the instrument can simply be lifted away from their base units 200, defeating the magnetic attachment between the units 100 and 200, and new carrier units 100 may then simply be situated atop the base units 200 in their stead. Provided the magnetic attraction between the carrier and base units 100 and 200 is sufficiently strong, no time-consuming adjustment of fasteners, latches, or other such attachment means is needed to affix the carrier units 100 to the base units 200. So long as the carrier and base units 100 and 200 are manufactured with the requisite degree of precision, the mounting nubs 202/204/206 and their mating depressions 102/104, and the magnets 108 and 210, can provide sub-micrometer reproduceability between successive mountings, without the need for alignment tuning once the carrier unit 100 is installed.

As previously noted, the mounting system 10 preferably utilizes rare earth magnets (or other strong magnets) for both the engaging magnets 108 and the receiving magnets 210. However, other magnets can be used. As an example, in an attracting pair of magnets 108 and 210, one of the magnets could be a permanent magnet and the other could simply be ferromagnetic material (e.g., an iron plug embedded in the carrier or base unit 100/200, which are themselves preferably formed of nonmagnetic material).

In some cases, different carrier units 100 to be used on the same base unit 200 may have different weights (e.g., owing to the different optical components 30 thereon). In this case, if the same degree of magnetic attraction is used for lighter carrier units 100 and heavier ones, it may be more difficult for a user to remove lighter carrier units 100 because of the magnetic attraction strength (whereas heavier carrier units 100 may be easier to remove because their weight may contribute to the applied removal force). In this situation, lighter carrier units 100 might bear a lesser number of engaging magnets 108, and/or might bear weaker engaging magnets 108, so that removal of the carrier units 100 is easier. Conversely, a heavier carrier unit 100 might bear a greater number of engaging magnets 108, and/or stronger engaging magnets 108, particularly if the base unit receiving face 208 is configured and oriented at such an angle that the carrier unit 100 could more readily fall off if weaker attraction is used.

Figure 3:
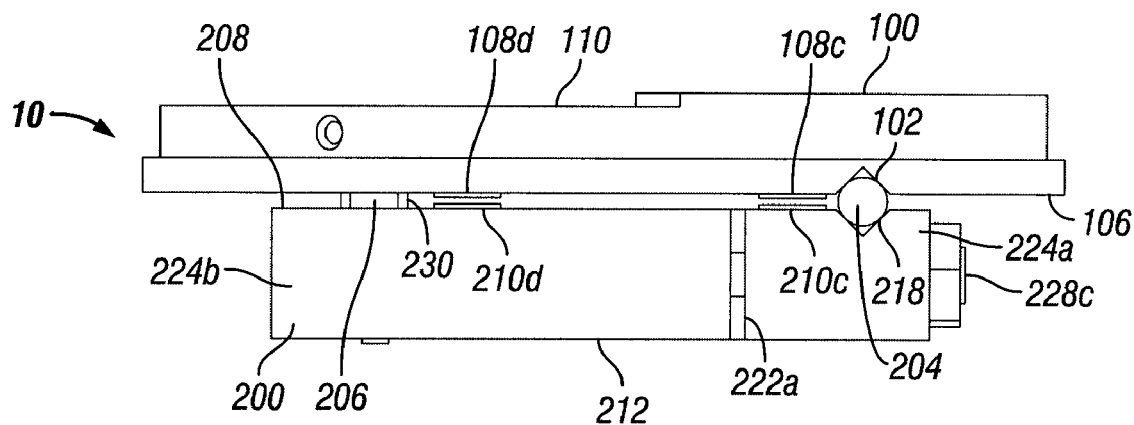
FIG. 3 is a side view of the mounting system 10 of FIGS. 1-2 wherein the carrier unit 100 is shown mounted upon the base unit 200.

It is notable that the carrier and base units 100 and 200 are preferably constructed so that the engaging magnets 108 and receiving magnets 210 are spaced apart when the carrier unit 100 is in the mounted state, as seen in FIG. 3. As a result, any metallic filings/particles that may inadvertently accumulate on the carrier unit 100 (and the base unit 200) when the unit is dismounted will not affect the precision engagement between the carrier unit 100 and base unit 200.

Figure 2:
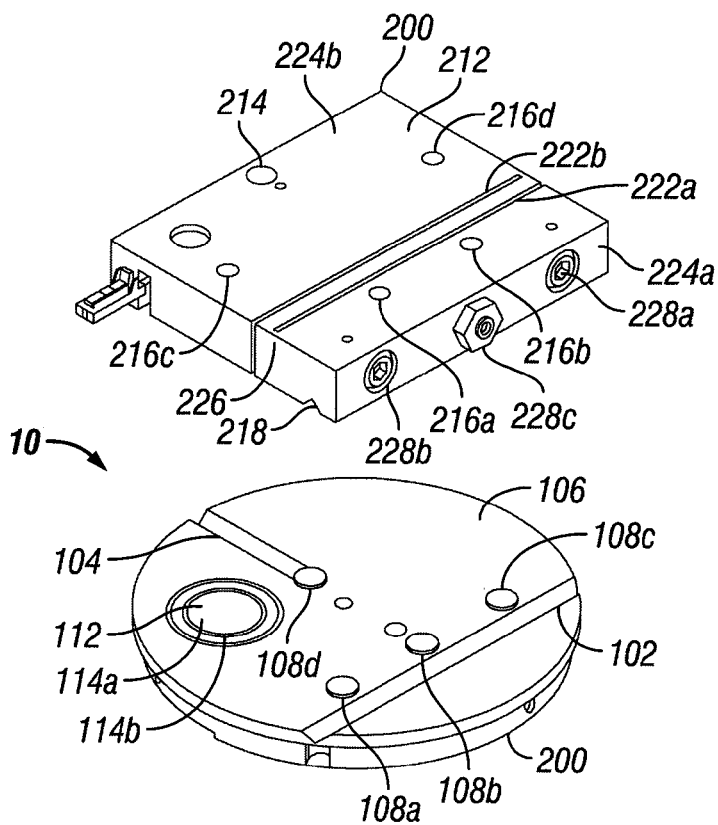
FIG. 2 is a second perspective view of the mounting system 10 of FIG. 1, illustrating the carrier unit 100 (without the optical component 30) and base unit 200 inverted (and rotated by 90 degrees) with respect to their arrangement in FIG. 1.

It is emphasized that the configurations of the carrier and base units 100 and 200 may vary significantly from those illustrated. For example, while the diffraction grating unit 40 in FIG. 4 contemplates use of the circular carrier unit 100 of FIGS. 1-3 in conjunction with the generally square base unit 200 to effect mounting within the instrument 20, the filter unit 50 contemplates the use of an elongated/rectangular carrier unit in conjunction with a corresponding base unit which may have any suitable configuration. The component face 110 of a carrier unit 100 need not be directly opposite the engaging face 106, and the component face 110 (and more generally the optical component 30 thereon) could be offset from the engaging face 106, aligned at any angle with respect to the engaging face 106, and can have a different size and/or shape. The same is true of the receiving face 208 of the base unit 200 with respect to the mounting face 212.

Additionally, while this document generally notes that three mounting nubs 202, 204, and 206 are used on a base unit 200, it should be understood that additional mounting nubs might be included as well; three is merely a preferred minimum number because it provides particularly stable mounting. In similar respects, spherical mounting nubs 202, 204, and 206 (or other mounting nubs which present generally hemispherical contact surfaces to carrier units 100), and V-groove depressions 102/104 (and 218/220), are merely preferred, and other configurations are possible. The placement of the mounting nubs 202, 204, and 206 and the depressions 102 and 104 that receive them might be reversed, with the carrier unit 100 bearing the mounting nubs 202, 204, and 206 and the base unit 200 bearing the receiving depressions 102 and 104, and/or the carrier and base units 100 might both bear some mounting nubs and receiving depressions. In any event, the number, nature, and placement of mounting nubs and depressions is preferably such that the carrier unit 100 may only be firmly received upon, and magnetically engaged to, the base unit 200 when the carrier unit 100 is placed on the base unit 200 in the proper orientation.

The optical component 30 borne by the carrier unit 100 can be any suitable device (or set of devices) which emits, transmits, reflects, refracts, diffracts, or otherwise provides or modifies light, including non-visible light. One or more of the optical components 30 situated on a carrier unit 100 may themselves be removable and replaceable—for example, an aperture within a lens array situated on the carrier unit 100—and in this case, the removable component might affix to the carrier unit 100 using an arrangement similar to that used between the carrier and base units 100 and 200.

Figure 4:
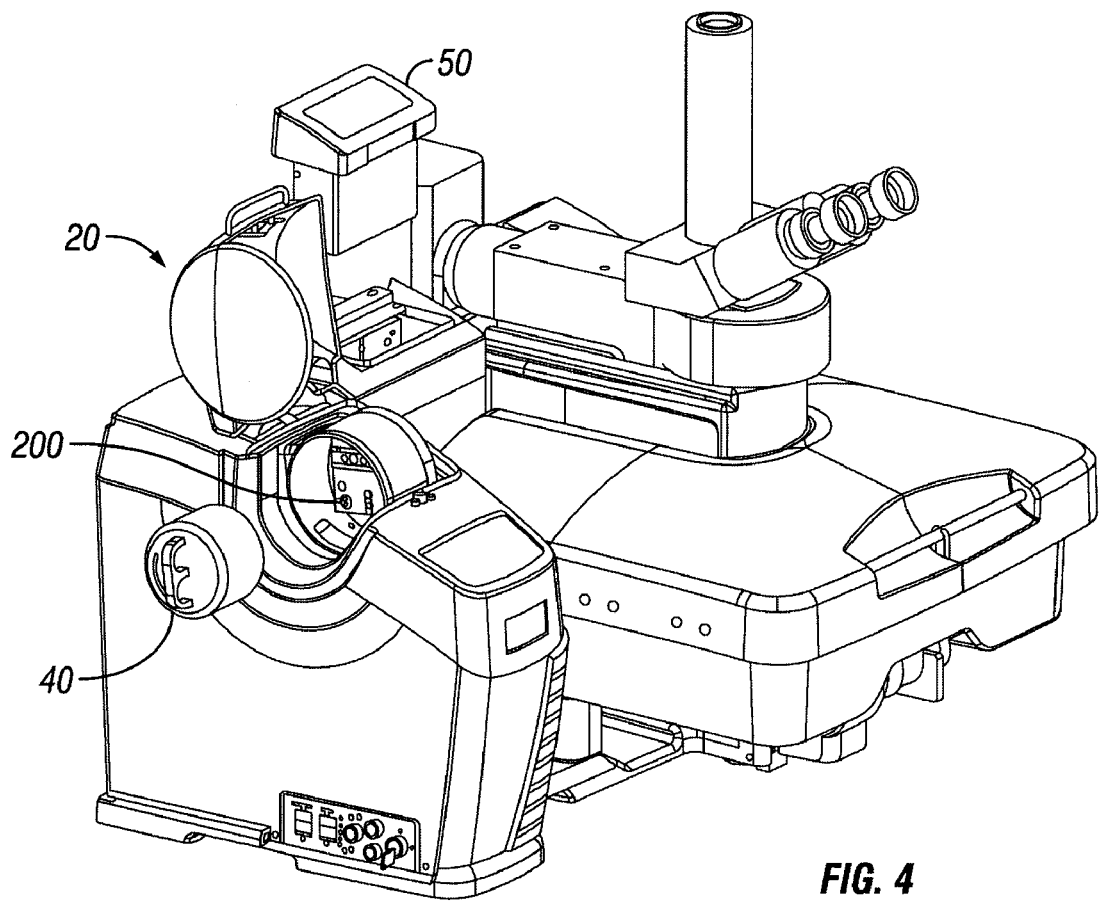
FIG. 4 is a perspective view of an exemplary instrument 20 (a Raman spectrometer) wherein the mounting system 10 of FIGS. 1-3 might be implemented, illustrating a base unit 200 which removably and replaceably receives a variety of diffraction grating units 40 which include different carrier units bearing different diffraction gratings (these carrier units and diffraction gratings not being shown), as well as a removable filter unit 50 which bears a filter on a carrier unit therein (not shown) for mounting on a corresponding base unit (not shown).

The instruments wherein the mounting system 10 might be implemented may also vary significantly. The instrument 20 depicted in FIG. 4 is a DXR Raman Microscope (Thermo Fisher Scientific, Madison, Wis. USA) which has been modified to accommodate different diffraction grating units 40 and filter units 50, as well as different carrier units 100 bearing different types of lasers and CCD cameras/photodetectors (though these are not shown). The ability to rapidly swap out components, with the components having precise alignment upon installation without the need for manual lock-down steps or alignment-tuning steps, greatly enhances the ease of use of the instrument 20.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A mounting system for interchangeable optical components, the mounting system including:
   a. a base unit having:
      (1) a mounting face, the mounting face being affixable to an instrument wherein optical components are interchangeably received;
      (2) a receiving face including:
         (a) first, second, and third mounting nubs, the mounting nubs protruding above the area of the receiving face situated between the mounting nubs;
         (b) receiving magnets;
   b. a carrier unit having:
      (1) a component face adapted to bear an optical component;
      (2) an engaging face including:
         (a) an engaging face first depression, the engaging face first depression being elongated along a path whereby the first and second mounting nubs may be received therein when the engaging face of the carrier unit is situated adjacent the receiving face of the base unit;
         (b) an engaging face second depression, the engaging face second depression being situated whereby it may receive the third mounting nub therein when the first and second mounting nubs are received within the engaging face first depression;
         (c) engaging magnets, the engaging magnets being at least substantially aligned with the receiving magnets when the first and second mounting nubs are received within the engaging face first depression and the third mounting nub is received within the engaging face second depression.

2. The mounting system of claim 1 wherein each engaging magnet is:
   a. attracted to, and
   b. spaced from,
   a corresponding one of the receiving magnets when the first and second mounting nubs are received within the engaging face first depression and the third mounting nub is received within the engaging face second depression.

3. The mounting system of claim 1 wherein the receiving magnets are each situated at least partially within an area defined between the mounting nubs.

4. The mounting system of claim 1 wherein each mounting nub defines an at least substantially hemispherical surface above the area of the receiving face.

5. The mounting system of claim 1 wherein each mounting nub is defined by a sphere affixed within a depression defined in the receiving face.

6. The mounting system of claim 1 wherein:
   a. the first and second mounting nubs are each defined by spheres, with the first and second mounting nubs being situated within a receiving face first depression defined along a path in the receiving face;
   b. the third mounting nub is defined by a sphere, with the third mounting nub being situated within a receiving face second depression defined in the receiving face.

7. The mounting system of claim 6 wherein the receiving face second depression is defined along a path in the receiving face, with the path of the receiving face second depression being non-parallel to the path of the receiving face first depression.

8. The mounting system of claim 6 wherein the engaging face second depression is defined along a path in the engaging face, with the path of the engaging face second depression being non-parallel to the path of the engaging face first depression.

9. The mounting system of claim 1 wherein the engaging face second depression is defined along a path in the engaging face, with the path of the engaging face second depression being at least substantially perpendicular to the path of the engaging face first depression.

10. The mounting system of claim 1 wherein the base unit includes:
    a. a slot extending from its mounting face through a major portion of the base unit, the slot defining base unit sections on opposite sides of the slot, with a minor portion of the base unit joining the base unit sections;
    b. a tensioner extending between the base unit sections, whereby the tensioner is adjustable to draw the base unit sections toward each other about the minor portion of the base unit.

11. The mounting system of claim 1 wherein:
    a. the carrier unit bears readable information regarding an optical component situated on the component face; and
    b. the base unit bears a reader which reads the readable information from the carrier unit when the first and second mounting nubs are received within the engaging face first depression and the third mounting nub is received within the engaging face second depression.

12. The mounting system of claim 1 wherein:
    a. the carrier unit has at least a major portion of its volume formed of a first material, and
    b. the engaging face is defined by a second material having a lower coefficient of friction than the first material.

13. The mounting system of claim 1 wherein:
    a. the mounting face of the base unit is affixed to a spectrometer, and
    b. the component face of the carrier unit bears one or more of:
       (1) a diffraction grating, and
       (2) an optical filter.

14. The mounting system of claim 1 wherein between:
    a. a first mounted state wherein the carrier unit is received on the base unit with the first and second mounting nubs received within the engaging face first depression and the third mounting nub being received within the engaging face second depression, and
    b. a second mounted state wherein the carrier unit is received on the base unit with the first and second mounting nubs received within the engaging face first depression and the third mounting nub being received within the engaging face second depression, the second mounted state occurring after the carrier unit has been removed from the first mounted state,
    the carrier unit has no more than 0.0001 inches of deviation in its position on the base unit.

15. A mounting system for interchangeable optical components, the mounting system including:
    a. a base unit affixed within an instrument wherein optical components are interchangeably received, and
    b. a carrier unit bearing an optical component, the carrier unit being removably mountable to the base unit,
    wherein:
    (1) one of the base unit and the carrier unit includes a face having first, second, and third mounting nubs protruding therefrom;
    (2) the other of the base unit and the carrier unit includes a face having:
        (a) an elongated first depression defined therein, wherein the first depression simultaneously receives the first and second mounting nubs therein when the carrier unit is situated in a mounted state with respect to the base unit;
        (b) an elongated second depression defined therein, the second depression being aligned at least substantially perpendicular to the first depression, wherein the second depression receives the third mounting nub therein when the carrier unit is situated in the mounted state with respect to the base unit; and
    (3) the base unit and the carrier unit each bear one or more magnets, wherein each magnet of the carrier unit is:
        (a) at least substantially aligned with,
        (b) spaced from, and
        (c) attracted to
        a corresponding one of the magnets of the base unit when the carrier unit is situated in the mounted state with respect to the base unit.

16. The mounting system of claim 15 wherein each mounting nub defines an at least substantially hemispherical surface protruding from the face of the base unit or the carrier unit.

17. The mounting system of claim 15 wherein each mounting nub is defined by a sphere affixed within a groove defined in the face of the base unit or the carrier unit.

18. The mounting system of claim 17 wherein each groove:
    a. is elongated, and
    b. aligned along an at least substantially linear path.

19. The mounting system of claim 17 wherein:
    a. the first and second mounting nubs are affixed within a first groove defined in the face of the base unit or the carrier unit;
    b. the third mounting nub is affixed within a second groove defined in the face of the base unit or the carrier unit, wherein the second groove is aligned at least substantially perpendicular to the first groove.

20. The mounting system of claim 17 wherein the carrier unit, when removed from the mounted state and subsequently replaced in the mounted state, has no more than 0.0001 inches of deviation in its position on the base unit.

21. A mounting system for interchangeable optical components, the mounting system including:
    a. a base unit having:
        (1) a mounting face affixable to an instrument wherein optical components are interchangeably received;
        (2) a receiving face including:
            (a) an elongated receiving face first depression;

(b) first and second mounting nubs, the first and second mounting nubs each:
  (i) being defined by a sphere affixed within the receiving face first depression, and
  (ii) defining an at least substantially hemispherical surface protruding from the receiving face,
(c) an elongated receiving face second depression aligned at least substantially perpendicular to the receiving face first depression;
(d) a third mounting nub:
  (i) defined by a sphere affixed within the receiving face second depression, and
  (ii) defining an at least substantially hemispherical surface protruding from the receiving face,
b. a carrier unit having:
  (1) a component face adapted to bear an optical component;
  (2) an engaging face including:
    (a) an elongated engaging face first depression;
    (b) an elongated engaging face second depression aligned at least substantially perpendicular to the engaging face first depression;
wherein:
A. the carrier unit may be situated in a mounted state with respect to the base unit with:
  i. the receiving face of the base unit spaced from the engaging face of the carrier unit,
  ii. the first and second mounting nubs situated in the engaging face first depression with each of the first and second mounting nubs engaging opposing sides of the engaging face first depression, and
  iii. the third mounting nub situated in the engaging face second depression with the third mounting nub engaging opposing sides of the engaging face second depression.

22. The mounting system of claim 21 wherein:
a. the base unit includes one or more receiving magnets;
b. the carrier unit includes one or more engaging magnets;
c. when the carrier unit is in a mounted state with respect to the base unit, each engagement magnet is:
  (1) at least substantially aligned with,
  (2) spaced from, and
  (3) attracted to
  a corresponding one of the receiving magnets.

23. The mounting system of claim 22 wherein each receiving magnet is situated at least partially within an area defined between the mounting nubs.

\* \* \* \* \*